Jan. 12, 1932.    L. G. L. THOMAS    1,840,752
BEARING FOR IMPELLERS
Filed April 25, 1929
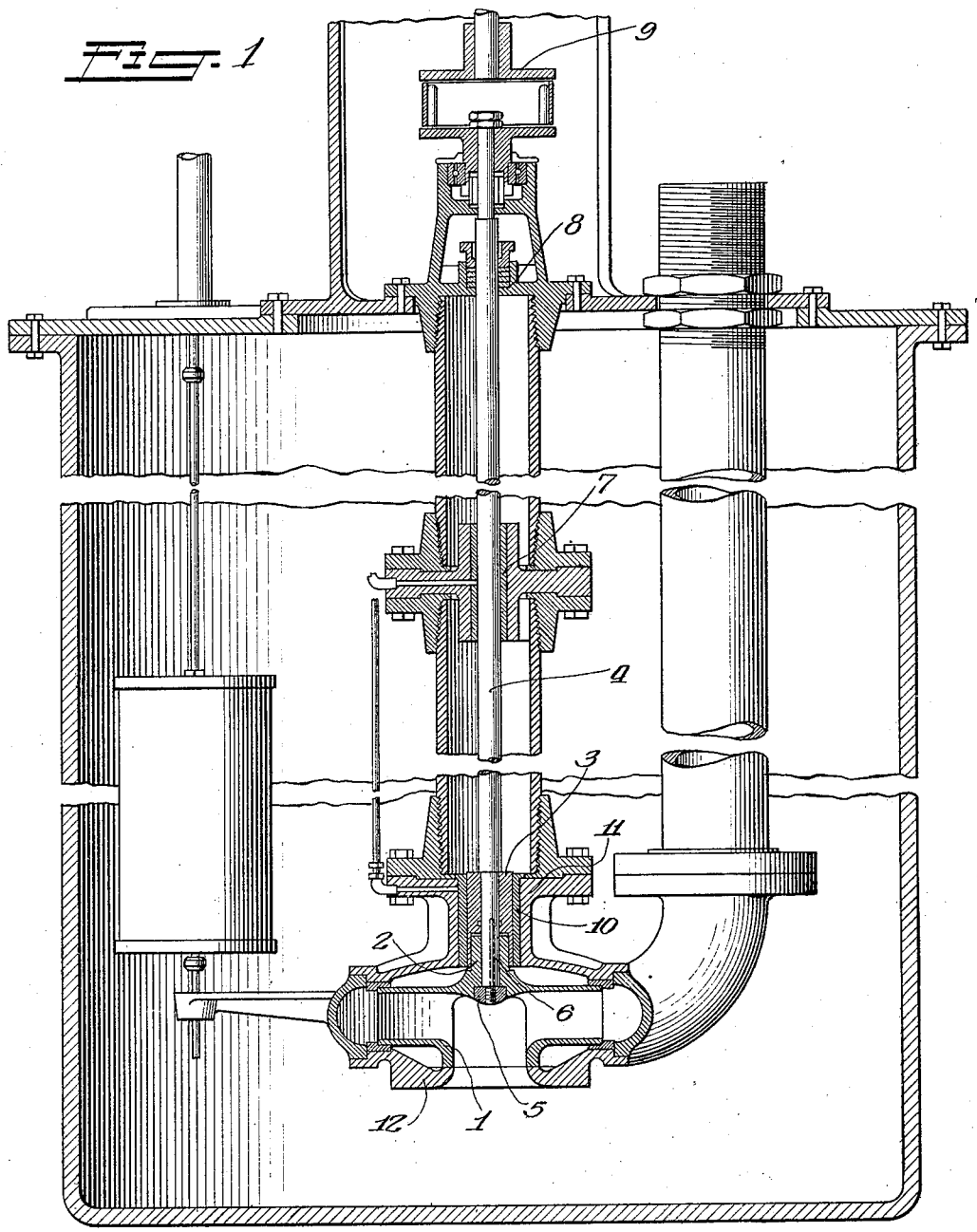
Inventor:
Louis G. L. Thomas.
by Charles J. Hills
Attys.

Patented Jan. 12, 1932

1,840,752

UNITED STATES PATENT OFFICE

LOUIS G. L. THOMAS, OF CHICAGO, ILLINOIS

BEARING FOR IMPELLERS

Application filed April 25, 1929. Serial No. 358,030.

This invention relates to a journal for impellers.

In the past, more or less difficulty has been encountered in centrifugal pumps, especially of the sump type, due to the fact that the impellers thereof have been provided with an integral bearing shaft. After a certain amount of usage, this shaft would wear causing the impeller to wobble and rotate in an irregular path. Of course, when this was discovered, it was necessary to discard the impeller and replace the same by a new one. The replacement of impellers due to the worn out character of their shafts involved an expensive procedure, and it is an object of this invention to avoid this constant replacing of impellers that are substantially in good order with the exception of the worn character of the supporting shaft thereof. To this end, the impeller is provided with a removable journal which may be replaced when worn out without having to discard the impeller as in the past.

The invention comprises the novel structure and combination of parts hereinafter described and more particularly pointed out and defined in the appended claims.

In the accompanying drawing, which illustrates a preferred form of this invention, the figure is a vertical sectional view through a sump pump having an impeller involving this invention.

In the drawing, there is illustrated a sump pump having an impeller provided with an integral bearing neck or shaft 2 upon which a removable journal 3 is secured. It will be noted that the journal 3 is provided with a cylindrical socket in one end for receiving the bearing neck 2. The bearing neck 2 and the removable journal 3 are provided with bores for receiving the lower end of a spindle 4. The lower end of the spindle 4 is provided with a nut 5 that engages in a recess in the impeller 1, and this end of the spindle 4 is suitably keyed to the neck 2 and journal 3 by means of a key 6. The spindle extends upwardly through suitable bearings 7 and 8, and connects with a flexible coupling 9 at its upper end. The flexible coupling 9 is adapted to be driven by some source of power such as a motor not shown. The bearings 7 and 8 are a part of a housing enclosing the spindle 4, but as this structure is old and well-known, it need not be further described.

The aforementioned removable journal 3 is mounted for rotation within a cylindrical bushing 10, which may be of brass or bronze or any other suitable material. The bushing 10 is mounted in a cylindrical bearing aperture formed in a bearing housing 11 which is flanged at its lower end and forms a part of the impeller casing. The bottom of the impeller casing is formed by a removable plate 12. It might be mentioned that the bearing housing 11 is a part of the main bearing housing for the spindle 4.

It will be obvious that according to this invention, the wear arising from the rotation of the impeller on the journal 3 is not serious since the same may be removed and replaced at any time without the necessity for discarding the impeller 1. This may be accomplished by removing the plate 12 and disconnecting the impeller from the spindle 4. The bushing 3 may then be removed from its bearing together with the impeller if desirable, or they may be separately removed. A new journal may then be placed upon the neck 2 of the impeller and the parts may be reassembled.

I am aware that many changes may be made and numerous details of construction may be varied through a wide range without departing from the principles of this invention and I, therefore, do not purpose limiting the patent granted thereon, otherwise than necessitated by the prior art.

I claim as my invention:

1. The combination with a rotary impeller having an integral bearing neck, a journal having a socket in one end for removably receiving said bearing neck, and a bearing housing in which said journal member is journalled for rotation.

2. The combination with an impeller having a laterally projecting neck, a journal member having a socket in one end for receiving said neck, a bearing housing in which said member is rotatably mounted, and a spindle extending through said bearing member and neck for rotating said impeller.

3. The combination with a vertical housing, a vertical spindle in said housing, an impeller secured to the end of said spindle, said impeller having a bearing neck through which said spindle passes, a removable journal having a socket for receiving said bearing neck, and a bushing in said housing in which said journal member is journalled.

4. The combination with a vertical housing having a cylindrical bearing at its lower end, a bushing in said bearing, a removable journal member in said bushing provided with a socket, an impeller having a neck engaging said socket and a vertical spindle extending through said housing and secured to said impeller.

In testimony whereof I have hereunto subscribed my name at Chicago, Cook County, Illinois.

LOUIS G. L. THOMAS.